March 27, 1934.  J. B. BARNITT ET AL  1,952,784
HEAT INSULATING STRUCTURE
Filed Dec. 1, 1931
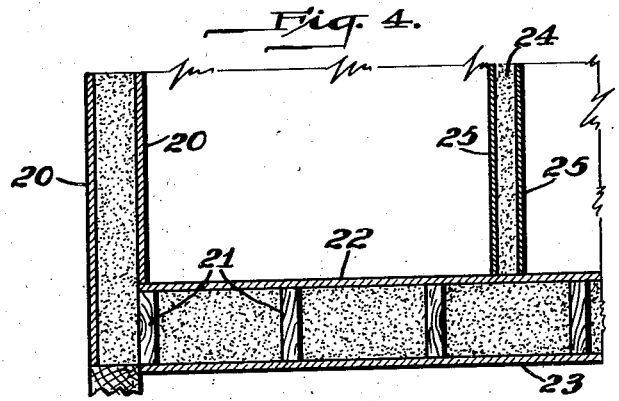
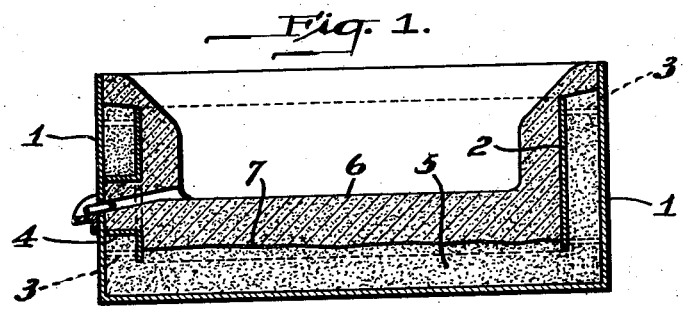
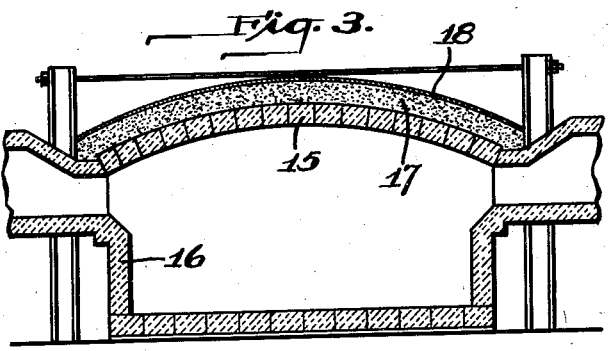
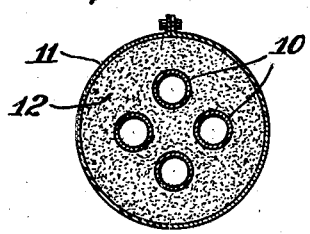
WITNESSES
A. B. Wallace.
J. B. Flick.
INVENTORS
Jesse Bryte Barnitt
and Ralph B. Derr
by Brown & Critchlow
their attorneys.

Patented Mar. 27, 1934

1,952,784

UNITED STATES PATENT OFFICE 1,952,784

HEAT INSULATING STRUCTURE

Jesse Bryte Barnitt, Pittsburgh, and Ralph B. Derr, Oakmont, Pa., assignors to Aluminum Company of America, Pittsburgh, Pa., a corporation of Pennsylvania Application December 1, 1931, Serial No. 578,396

3 Claims. (Cl. 72—16)

This invention relates to heat insulation, and more particularly to structures for heat insulating other structural objects.

The materials customarily used for heat insulation of furnaces, annealing ovens, pipes, etc., are chiefly diatomaceous or infusorial earth, magnesia, silica, asbestos and the like. These materials may be used in loose, or bulk, form, or in a bonded and shaped condition. Some of the heat insulating materials used prior to our invention when suitably bonded afford high resistance to heat transfer at elevated temperatures. However, in many instances it is impractical to use bonded insulators to form the entire insulating structure, it being preferable either to use the insulating material in loose, unbonded form, or to use such loose material in conjunction with bonded insulators. But in general the loose materials heretofore available have not been fully satisfactory at elevated temperatures. For instance, of the materials commercially used for this purpose, diatomaceous earth has about the highest thermal resistance at elevated temperatures, but it has not been satisfactory as a loose insulator for such use, chiefly because it is subject to excessive shrinkage under the action of high temperatures. Such shrinkage impairs the insulating efficiency of the material, and this disadvantage has characterized the materials previously used in the loose unbonded state.

It is among the objects of this invention to provide structures which are to be thermally insulated with heat insulating structures which have low heat conductivity at elevated as well as at low temperatures, withstand very high temperatures without damage to the insulating material and without impairing its efficiency, make use of an insulating material having a high fusion point, a low co-efficient of thermal expansion, and minimal shrinkage, and are of simple and relatively cheap construction.

The invention may be described in connection with the accompanying drawing, in which Fig. 1 represents an electrolytic cell for producing aluminum provided with a heat insulating structure constructed in accordance with this invention; Figs. 2 and 3 sectional views illustrating the application of the invention to insulation of piping and a glass furnace respectively; and Fig. 4 a fragmentary section through a cold storage chamber or the like provided with the insulating structure of the invention.

It is an essential requirement of heat insulators for use at elevated temperatures that they shall not fuse in use. Pure aluminum oxide has an exceedingly high melting point, about 3720° F., and it is known to be a suitable refractory for some purposes. Generally speaking, however, aluminum oxide has not been considered as ranking among the better heat insulators. Thus, ordinary aluminum trihydrate has a heat conductivity, which, comparatively, is substantially greater than that of standard insulating materials. Dehydration of this material, whether completely or to form lower hydrates, does not substantially improve the thermal resistance. Consequently, the general opinion has been that aluminum oxides were not particularly suited for heat insulating uses.

The present invention is predicated upon our discovery that furnaces, cold storage chambers and other similar structures may be satisfactorily thermally insulated by associating with them a structure comprising two walls forming a compartment in which there is disposed a mass of aluminum oxide which has been artificially produced in a finely divided monohydrate, or substantially monohydrate, form from an aluminous material of higher hydration. We have discovered that aluminum oxide artificially prepared in this form is distinguished from the aluminum oxides known heretofore in that it possesses outstanding properties as a heat insulating material. Not only is it resistant to heat transfer, but its shrinkage is low. These properties are made use of in the practice of this invention.

Aluminum oxide in the form just referred to may be, and preferably is, prepared by digesting ordinary aluminum trihydrate with a solvent, such as a solution of sodium hydroxide, the proportions used being such that the amount of solvent (in this case sodium hydroxide) is insufficient to dissolve more than a small portion of the aluminum trihydrate present. When this mixture is heated at temperatures between about 250 and 400° F. under pressure there is produced a monohydrated aluminum oxide which is in an extremely fine state of sub-division and which possesses the valuable properties just referred to and presently to be discussed more in detail. This state apparently results from abstraction of a portion of the combined water content of the aluminum trihydrate and a rearrangement of the crystalline structure. The product may contain some of its aluminum oxide content in the form of trihydrate, but it consists predominantly of aluminum oxide in the monohydrate form, and it is very light and fluffy.

The procedure just described produces the monohydrated material in a form of substantial purity, because the aluminum trihydrate contains only small percentages of impurities. However, the same process may be applied to bauxite or other naturally occurring aluminous materials whose aluminum oxide content is in the form of a hydrate higher than the monohydrate form. When such aluminous material is treated in the manner explained hereinabove the resulting product is chiefly aluminum oxide in the monohydrate form, although it contains varying amounts of oxides of iron, silicon, titanium, etc., as impurities. The material produced from bauxite or the like is, of course, more economical to prepare than that made from the trihydrate, and, except where it is desirable to have a material substantially free from impurities, it forms a very satisfactory heat insulator, and may be used for most purposes in the practice of the invention.

Aluminum oxide in this artificially prepared monohydrate form possesses heat insulating properties which clearly distinguish it from all of the aluminum oxide materials known heretofore, and for this reason, it will be referred to hereinafter, for the sake of brevity, as special alumina.

In accordance with the invention the surfaces of structures to be thermally insulated are associated with a double-walled compartment containing a mass of the special alumina. Such compartments may take various forms, be associated with a single surface, or surround an entire structure. For most purposes one wall of the structure to be insulated may serve as one of the compartment walls, as will appear from the accompanying drawing. For example, the special alumina may be placed between one wall of a furnace and an outer shell.

The special alumina is not bonded for this purpose, but is in the form of a loose mass disposed within the double-walled structure referred to. If the article to be insulated is not subjected to elevated temperatures, the special alumina will remain in its monohydrate form, but under the action of elevated temperatures it may, and if the temperature be high enough will, become dehydrated. Thus, we have found that this special alumina in its monohydrate form gradually loses its water content when heated above about 700° F. A particular feature of the special alumina is that when dehydrated it does not merely retain its heat insulating characteristics, but actually they become improved as a result of the dehydration. Furthermore, the loss of water in dehydration does not result in any appreciable change in volume of the material.

If desired, the special alumina may be heated or calcined prior to being placed in the structure. When so used, its subsequent heating in use does not change its insulating or other characteristics, but on the contrary, as mentioned hereinabove, its superior heat insulating properties remain practically constant.

As showing the remarkable thermal resistance of this special alumina, as compared with the previously known forms of aluminum oxide, actual tests have shown that at temperatures of about 900° F. the thermal conductivity of this special alumina in dehydrated form is about one-third that of ordinary calcined alumina. For example, tests of powdered loose aluminum oxide calcined at 900° have shown that at a mean temperature of 1000° F. it has a thermal conductivity of from 2.15 to 2.58 calculated in British thermal units per square foot per degree Fahrenheit per hour per one inch thickness. Corresponding tests made of the artificially prepared monohydrated oxide showed its thermal conductivity used in the practice of this invention under the same conditions to be 0.75 to 0.80.

As further showing the valuable thermal resistant properties of this material, a silica tube 8 inches in diameter was hand packed with the special alumina and heated externally to about 1800° F. Thermocouples placed against the inside surface of the tube, and at the center of the packing of special alumina, showed a substantially constant temperature of 1800° F. at the inside surface of the tube, and that the heat transfer through the packing was so slow that after heating for 1½ hours the temperature at the center of the tube was only 660° F. It required five hours to raise the temperature of the material at the center of the tube to 1325° F., and seven hours to raise it to 1650° F.

These results are all the more surprising in view of the fact that the special alumina may be prepared in a form having high bulk density. The best heat insulators heretofore available have had a bulk density of about 12 to 18 pounds per cubic foot, and, generally, as the density increases the heat conductivity increases. Hence the opinion of those cognizant with the art has been that heat conductivity is a primary function of density. The special alumina used in the practice of this invention may be prepared in a form having a bulk density of 35 to 40 pounds per cubic foot, depending upon the conditions under which it is produced, but our experiments have shown that the thermal conductivity of such material is not substantially greater than that of monohydrated alumina having a bulk density of 16 to 22 pounds per cubic foot.

The invention is applicable to substantially all types of structures which it is desired to heat insulate, such, for example, as kilns, furnaces, retorts, stills, pipes, cold storage chambers, various building structures, and others. Its various applications may be further understood through reference to the accompanying drawing, which shows typical structures constructed in accordance with it.

Fig. 1 shows the invention as applied to an electrolytic cell used for the production of aluminum by the Hall process. The cell comprises a box-like sheet metal shell having side walls 1 within which there is disposed an annular sheet metal liner 2 held in spaced relation from the side walls by connector brackets 3. The liner does not extend to the bottom of the cell, and its upper edge is disposed below the level of the top edge of the shell. At one side the liner is provided with a tubular projection 4 adapted to form a tapping spout for drawing off aluminum from the cell.

In accordance with the invention a mass of special alumina 5 is shoveled into the double-walled compartment formed between side walls 1 and liner 2, a layer is also placed in the bottom. A carbonaceous lining 6 is then built up as shown in Fig. 1. In forming these structures it is preferred to roughly level off the surface of the special alumina and to stretch a sheet of heavy paper 7 on top of it, to prevent dusting and undue displacement of the special alumina when lining 6 is tamped into place. A light gauge iron sheet may be used instead of the paper, if desired.

In the structure shown in Fig. 1 it will be observed that liner 2 and the bottom surface of carbonaceous lining 6 act as one wall of the insulating structure. This materially simplifies these insulator constructions, as it eliminates the use of separate walls.

A further application is shown in Fig. 2 in which a group of superheated steam pipes 10 are insulated by means of a structure comprising a circular sheathing 11, of any suitable material, disposed about the pipes. The compartment formed between the outer surfaces of the pipes and the sheathing is filled with a mass 12 of special alumina, so that as in the preceding case one wall of the structure to be insulated, i. e. the outside of the pipes, cooperates to form the heat insulating structure.

Still another application of the invention is shown in Fig. 3, in which the roof 15 of a glass tank 16, of conventional construction, is covered by a layer 17 of the special alumina, this being held in place by a sheet metal cover plate 18, which completes the heat insulating structure.

The use of the invention for insulating building structures such as cold storage chambers, rooms and the like, is illustrated schematically in Fig. 4. The outside wall of the chamber is formed by studs 20, or other suitable members, spaced apart in the usual manner, and the floor comprises joists 21 upon which flooring 22 is laid. Sheathing 23 is applied to the under sides of the joists. The space between studs 20, and the spaces formed by joists 21, flooring 22, sheathing 23, and also the spaces 24 between the sides of the partition walls 25 are filled with special alumina in accordance with the invention. This provides an adequately heat insulated structure, and such a structure has the further advantage that it acts as a fire stop to prevent fire from running along the natural flues formed in the walls and partitions.

We have found that in heat insulating structures of the type described, i. e., formed of two walls forming a compartment which is filled with special alumina in unbonded form, the special alumina affords the greatest thermal resistance when it is used without admixture of other materials. In general, the thermal resistance of a heat insulator formed chiefly of this special alumina decreases with relation to the increase of the percentage of other admixed materials, although such materials, for example magnesia and asbestos, may be used if desired for special purposes. However, we have found that where low thermal conductivity is desired the mass should contain a minimum of special alumina which is not less than about 30 to 40% of the total.

This application is a continuation in part of our preceding application for patent filed June 27, 1927, Serial No. 201,958.

According to the provisions of the patent statutes, we have explained the principle and mode of operation of our invention and have illustrated and described what we now consider to represent its best embodiment. However, we desire to have it understood that, within the scope of the appended claims, the invention may be practiced otherwise than as specifically illustrated and described.

We claim:

1. A heat insulating structure including two walls forming a compartment therebetween, the compartment containing a mass of aluminum oxide having been artificially produced in a finely divided substantially monohydrate form from an aluminous material of higher hydration.

2. A heat insulating structure including two walls forming a compartment therebetween, the compartment containing a mass of heat insulating material containing more than about 30 percent of aluminum oxide having been artificially produced in a finely divided substantially monohydrate form from an aluminous material of higher hydration.

3. A heat insulating structure including two walls forming a compartment therebetween, the compartment containing a mass of heat insulating material formed by dehydration of an aluminum oxide having been artificially produced in a finely divided substantially monohydrate form from an aluminous material of higher hydration.

JESSE BRYTE BARNITT.
RALPH B. DERR.